United States Patent [19]
Krysiak

[11] Patent Number: 5,560,575
[45] Date of Patent: Oct. 1, 1996

[54] SUPPORT AND RELEASABLE FASTENER ASSEMBLY

[75] Inventor: David J. Krysiak, Pleasant Ridge, Mich.

[73] Assignee: TRW Inc., Cleveland, Ohio

[21] Appl. No.: 391,140

[22] Filed: Feb. 21, 1995

[51] Int. Cl.⁶ .................................................... F16L 3/08
[52] U.S. Cl. ................................. 248/222.12; 248/231.9; 296/214; 411/41; 411/60
[58] Field of Search ...................... 248/222.12, 222.11, 248/223.31, 223.41, 224.8, 225.11, 220.21, 231.9; 296/214; 411/41, 45, 46, 48, 60

[56] References Cited

U.S. PATENT DOCUMENTS

| | | |
|---|---|---|
| D. 297,613 | 9/1988 | Yokoyama et al. . |
| D. 297,614 | 9/1988 | Yokoyama et al. . |
| 3,678,797 | 7/1972 | Seckerson . |
| 3,918,130 | 11/1975 | Poe . |
| 4,637,765 | 1/1987 | Omata ........................................ 411/41 |
| 4,981,322 | 1/1991 | Dowd et al. ............................. 296/214 |
| 5,085,545 | 2/1992 | Takahashi ................................. 411/45 |
| 5,286,152 | 2/1994 | Anderson .................................. 411/45 |
| 5,314,227 | 5/1994 | Weiland et al. ............... 248/222.12 X |
| 5,358,299 | 10/1994 | Seto . |
| 5,409,336 | 4/1995 | Jericevich et al. ........................ 411/41 |

*Primary Examiner*—Ramon O. Ramirez
*Attorney, Agent, or Firm*—Fay, Sharpe, Beall, Fagan, Minnich & McKee

[57] ABSTRACT

A releasable push-in fastener assembly for joining a first component to a panel comprises a pair of spaced latch legs extending from the first component for engagement in an opening in the panel. An axially elongated pin is adapted to extend into the space between the legs from an opening in the first component to maintain the legs in their latched relationship with the opening in the panel. A shroud is carried by the outer end of the pin to enclose a portion of the first component to present a pleasing appearance and conceal the presence of the pin.

19 Claims, 5 Drawing Sheets

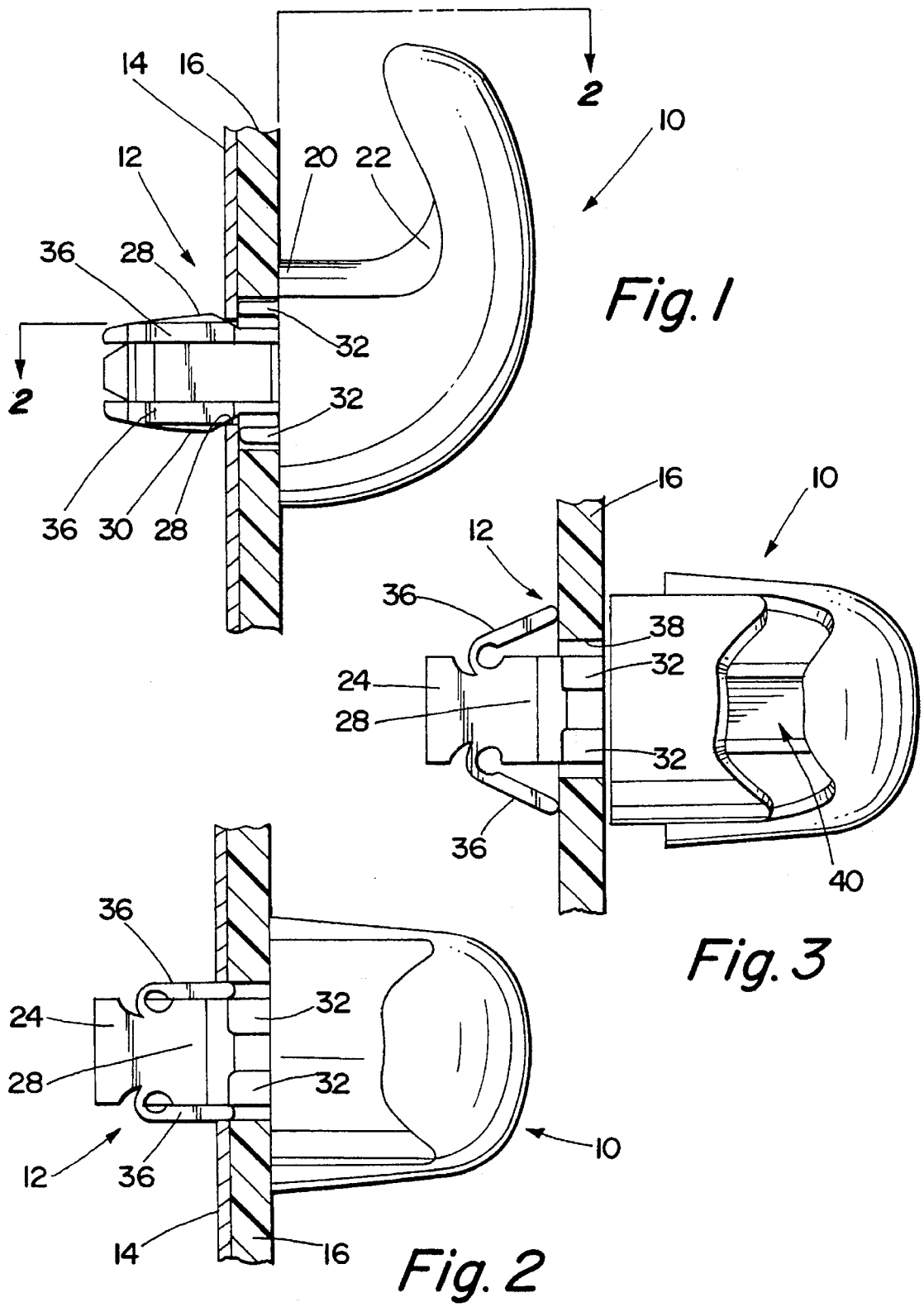

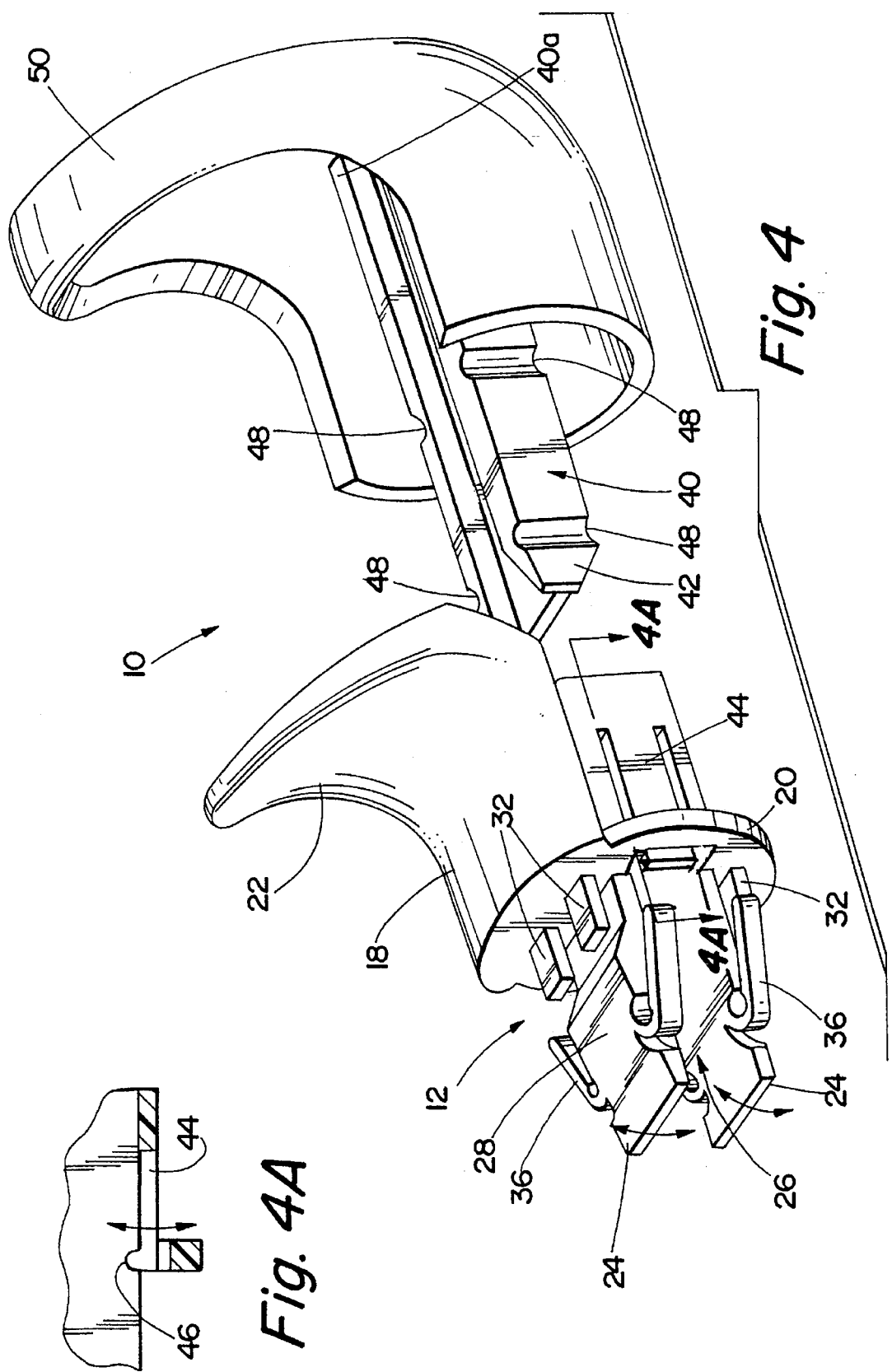

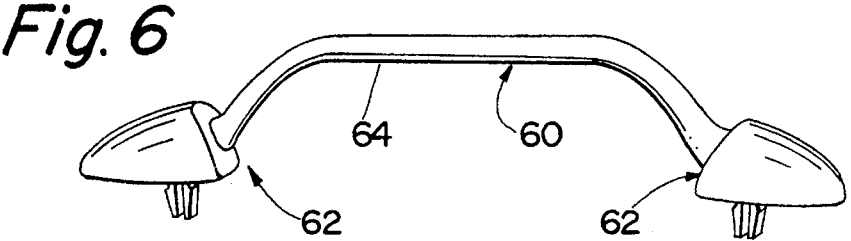
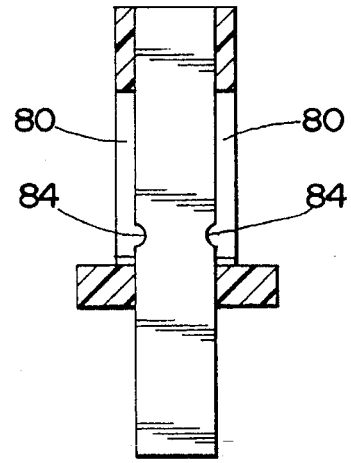
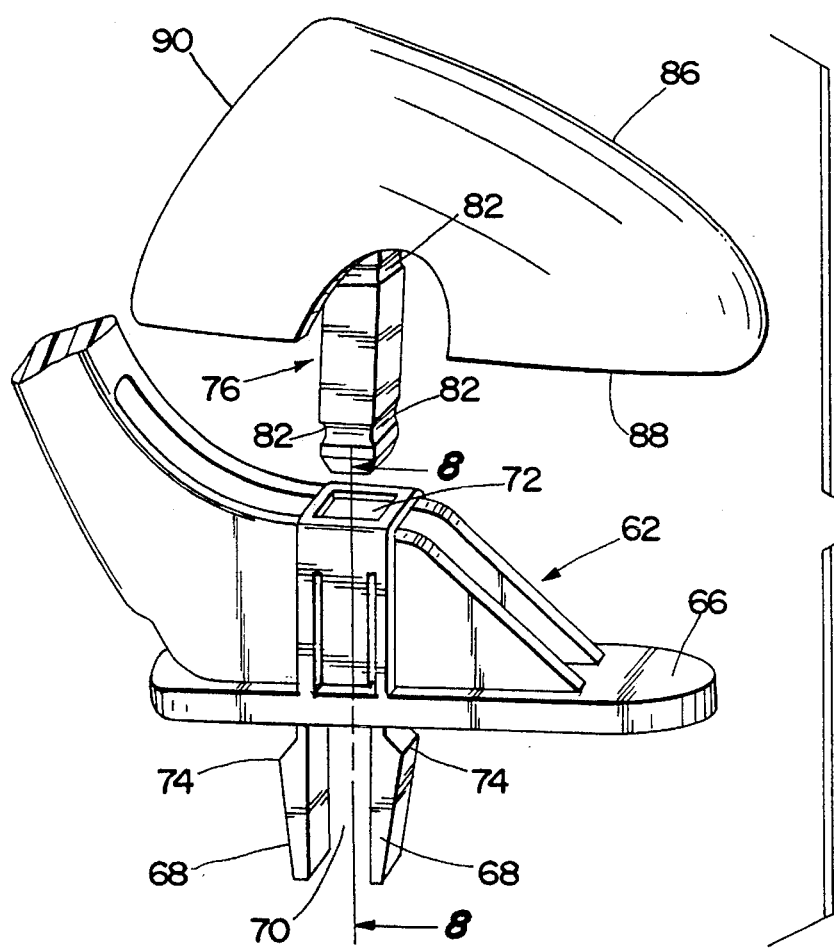

SUPPORT AND RELEASABLE FASTENER ASSEMBLY

BACKGROUND OF THE INVENTION

The subject invention is directed toward the fastener art and, more particularly, to a push-in type fastener that can be released and reused.

The invention is especially suited for incorporation in handles and coat hooks for releasably mounting them to motor vehicle body panels and the like and will be described with reference thereto; however, as will become apparent from the ensuing description, the invention could be incorporated in many different components in a variety of environments.

In commonly assigned U.S. patent application Ser. No. 08/270,463 filed Jul. 5, 1994 for "Visor Clip Assembly and Releasable Fastener," there is disclosed an efficient and effective fastener assembly that can be integrally incorporated into an associated component for providing releasable mounting of the component to a body panel or frame member of a motor vehicle. The fastener assembly eliminates the use of threaded fasteners, reduces installation time, and generally simplifies manufacture and assembly.

In its preferred form, the fastener comprises spaced resilient latch legs carried on the component to be mounted. The legs deflect radially inward toward one another to allow their positioning in a mounting opening formed in the vehicle body panel or frame. Once the latch legs are in the opening, a rigid pin member is inserted into the mounted component to enter between the latch legs and prevent their radial inward deflection. This locks the legs in the opening and holds the mounted component to the body panel or frame. The pin head is, however, readily visible and can be undesirable from an aesthetic standpoint.

SUMMARY OF THE INVENTION

The subject invention provides a rivet-type push-in fastener assembly specially for joining a first component such as a coat hook or handle to a support such as a vehicle body panel. According to a preferred form of the invention, the assembly comprises a pair of latch legs extending from the first component through an opening in the panel. The legs are on opposite sides of an open space and have spaced inner surfaces with at least one of the legs being laterally flexible relative to the opening and operative in an outer latch position to maintain the first component latched in the opening. A hole is formed through the first component with an entry end in an outer surface of the first component at a location spaced from the panel and an exit end adjacent the panel and opening to the open space between the legs. An axially elongated pin is adapted to extend into the hole. The pin has an outer end and an inner end with a body portion on the inner end. The body portion is sized to fit through the periphery of the hole through the first component but is of sufficient size to prevent the at least one leg from moving laterally inward from the outer latch position. Carried on the outer end of the pin is a shroud portion of shell-like configuration which encloses a portion of the first component and has a peripheral edge with a significant portion of the peripheral edge closer to the panel than the entry end of the hole through the first component.

Preferably, and in accordance with a preferred embodiment of the invention, the shroud substantially totally encloses a base portion of the first component and the pin so that the presence of the pin is not observable from the exterior of the assembly.

In accordance with a more limited aspect of the invention, the first component has a load-supporting portion which extends through an opening in the shroud and has a portion spaced a substantial distance outwardly of the panel.

In accordance with yet another aspect of the invention, the assembly includes retaining means for selectively and releasably latching the pin in the open space between the legs, and the shell-like shroud member is formed integrally with the pin.

The shroud portion can be contoured and designed so as to present a very pleasing appearance and form a continuation of the load-supporting portion of the first component. In its preferred form, the shroud extends completely to the bottom of the base to totally enclose this portion of the first component.

As can be appreciated from the foregoing, a primary object of the invention is the provision of a push-in type fastener assembly that can be integrated into the component being fastened in a manner that conceals the presence of the lock pin.

Yet another object of the invention is the provision of a fastener assembly that is particularly suited for incorporation in load-supporting members that must be releasably connected to panels and similar supports.

A further object of the invention is the provision of a fastener assembly of the type described that can be molded from plastic and incorporated directly into the components being mounted.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

FIG. 1 is a side elevational view, partially in section, showing a coat hook incorporating the improved fastener assembly and mounted in position in a vehicle interior;

FIG. 2 is a cross-sectional view taken on line 2—2 of FIG. 1;

FIG. 3 is a view like FIG. 2 but showing the coat hook preassembled to a vehicle headliner and prior to the time the headliner and coat hook assembly are installed against the vehicle body panel;

FIG. 4 is an exploded isometric view showing the two main components of the assembly prior to installation;

FIG. 6 is an isometric view of an assist handle assembly that incorporates the fastener assembly of the invention;

FIG. 7 is an exploded pictorial view showing an end portion of the assist handle assembly of FIG. 6;

FIG. 8 is a cross-sectional view taken on line 8—8 of FIG. 7; and,

DETAILED DESCRIPTION OF THE PREFERRED AND ALTERNATE EMBODIMENTS

Figure 5:
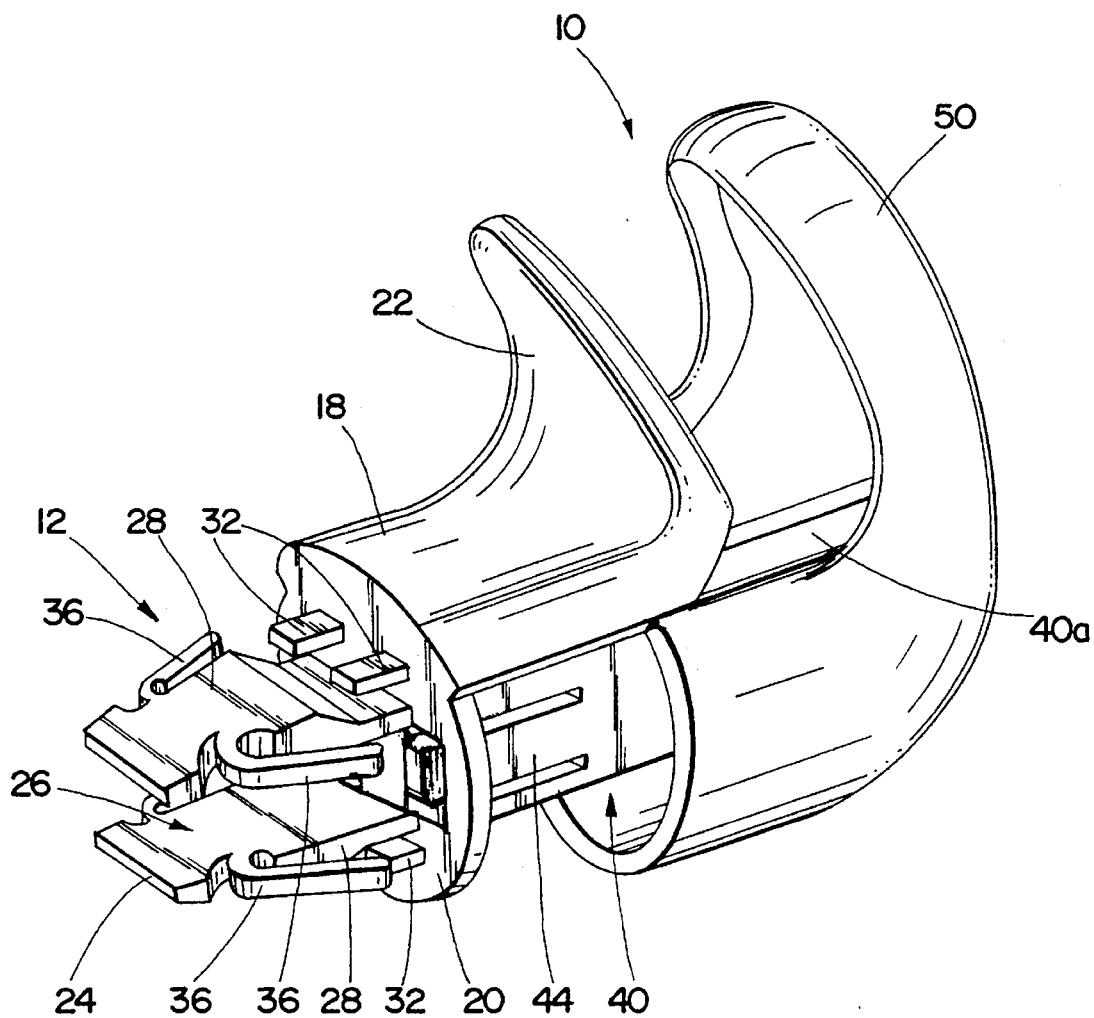
FIG. 5 is an isometric view showing the two main components of the assembly in a preassembled condition prior to installation.

Referring now to the drawings wherein the showings are for the purposes of illustrating the preferred embodiment of the invention only and not for purpose of limiting same, FIGS. 1 through 5 illustrate a coat hook 10 that has a fastener assembly 12 incorporated therein and embodying the preferred form of the invention. The coat hook 10 is broadly of the general type used in vehicle interiors to support garments and the like. As is well known and understood, such hooks are generally provided in the rear seat area of the vehicle compartment above the rear doors or side windows. The coat hook assembly is arranged to be releasably connected to the metal interior body panel 14 or similar body component in a position to overlie the headliner 16. The particular type of headliner 16 is not important to the invention. It could either be a resilient, relative soft, material such as a suitable fabric and bonded backing or a molded plastic as is commonly used.

In the subject invention, the arrangement of the fastener assembly 12 and its integration with the coat hook 10 can best be understood by reference to FIGS. 4 and 5. In particular, the coat hook 10 comprises a first load-supporting component 18 that includes a base portion 20 and an outwardly and upwardly extending load-supporting hook-like portion 22. Extending outwardly from the base portion 20 are a spaced pair of resilient legs 24 that are preferably integrally molded with the first component 18. The legs are spaced apart on opposite sides of an open space or area 26. Each of the legs 24 are designed so as to be deflectable toward and away from the open space 26. Additionally, each of the legs taper from their relatively narrow outer free ends to a somewhat thicker inner latch portion 28 as shown. The width and length of the legs is such that they can be inserted into the rectangular opening 30 formed in the vehicle body panel 14 as shown in FIG. 1. Note that the size and spacing of the legs are related to the size of the opening 30 such that when inserted into the opening, the legs can enter into the opening until the panel 14 is in the position shown in FIG. 1 and wherein the outward movement of the resilient legs causes them to expand and bring the latch portions 28 into the position shown. The final positioning of the legs 24 relative to the panel 14 is assured by four locating pins 32 which extend outwardly from the base 20 to a controlled spaced distance from the latch portions 28. The length of the pins 32 also serves to provide space between the base 20 and the latch portions for receipt of the headliner 16. By varying the distance of the pins and the latch portions 28 from the base 20, the amount of compression applied to the headliner can be controlled. Thus, the appearance of the headliner about the base of the hook assembly can be controlled.

Associated with the legs 24 are laterally extending, resilient spring fingers 36. FIGS. 3 through 5 show the spring fingers 36 in their normal, outward biased, as molded position. It should be seen that in the preferred embodiment there are four of the spring fingers 36 located in pairs on opposite sides of each of the legs 24. The spring fingers 36 allow the hook member 18 to be preassembled into an opening 38 in the headliner 16 in the manner shown in FIG. 3. Note that the hook assembly can be inserted through the opening 38 formed in the headliner. During passage through the opening 38, the spring fingers 36 collapse inwardly adjacent their associated leg 24. After passing through the headliner, they return to their original lateral outward position and thereby retain the hook assembly in a preassembled condition in headliner 16. Thereafter, the combined headliner and preassembled hook assembly 10 can be assembled to the panel 14 by inserting the legs through the previously-mentioned panel opening 30 to assume the positions shown in FIGS. 1 and 2. Preferably, the relationship of the spring fingers 36 to the latch portion 28 of legs 24 is such that when the legs are in their latched position in the opening 30, the spring fingers are held down by the side walls of opening 30 as shown in FIG. 2. This allows removal of the assembly from the mounted position shown in FIGS. 1 and 2 in a manner subsequently to be described. Alternatively, it is, of course, possible to provide the spring fingers 36 with sufficient resiliency that they can be forced completely in a reverse direction from that shown in FIG. 3 to also allow removal.

In order to lock the latch portion 28 in the mounted position shown in FIGS. 1 and 2, the fastener assembly includes a pin member 40 (see FIG. 4) that is adapted to enter into the open space 26 between the legs 24 and maintain them in their outward biased position shown in FIGS. 1 and 2. The pin member 40 is relatively rigid and has a cross-sectional shape and size to prevent the legs 24 from deflecting inwardly. Preferably, as shown in FIG. 4, the forward or outermost end of pin 40 is tapered as shown at 42 to facilitate entry into the opening in base 20 to the space 26.

In the subject embodiment, means are provided to releasably latch the pin 40 in its located position between legs 24. These means comprise a pair of opposed latch fingers 44. The latch fingers 44 are located on opposite sides of the passage in base 20 leading to the open space 26. As shown in FIG. 4A, the latch fingers are laterally resilient or deflectable and carry a latch tab or bead 46 at their free outer ends. The latch beads 46 are sized and positioned so as to enter correspondingly shaped recesses 48 located at axially spaced positions on opposite sides of the pin member 40 as best seen in FIG. 4. A first pair of the recesses 48 are located closely adjacent the end of pin 40 and function to hold the pin 40 in a preassembled position relative to the hook portion 18 and base 20 so that the components can assume the preassembled position shown in FIG. 5. This preassembled position assures that the components are joined and ready for use but, at this time, the pin 40 is not in a blocking position between the legs 24. The assembly can, at this time, be inserted into the headliner 16 to the position shown in FIG. 3 and, subsequently, inserted through the panel 14. Thereafter, the pin 40 can be driven further into the space 26 to the final located position illustrated in FIG. 1, for example. In this position, the second set of recesses 48 move into position relative to the latch fingers 44 and the latch protrusions 46, and the assembly is in its final assembled position shown in FIGS. 1 and 2.

Of particular importance to the invention is the arrangement wherein the pin 40 is totally enclosed and concealed when the assembly is in its final mounted position in the headliner 16 and the panel 14. As best illustrated and understood from FIGS. 4 and 5, the pin 40 carries a shroud portion 50 adjacent its outer end. The shroud 50 is shaped and contoured so as to preferably form a continuation of the hook load supporting portion 18 and the associated hook-like portion 22. Preferably, the shroud 50 is of a shell-like configuration and extends downwardly from the outer end 40a of pin 40 in a direction toward the base 20 so as to generally enclose base 20 and engage with the headliner 16. The load supporting portion 18 of the hook is, however, in a position so that all loads applied to the hook are borne directly by it as opposed to being transferred to the shroud 50. The shroud 50 thus totally encloses the base and the pin and appears as a continuation of the remaining portion of the hook so as to present an extremely attractive contoured shape and totally conceal the pin and its presence. As can be appreciated, the extent of the shroud relative to the load supporting portion 18 could vary from that shown, but it is preferred that it present total enclosure of the pin and the associated base structure of the hook.

The shroud and its relationship to the pin do not adversely effect the functioning of the pin and it is still possible to release the fastener assembly and remove the hook from its mounted position merely by pulling firmly on the shroud to move the pin 40 to the retracted position of FIG. 5. At that time, the entire assembly can be removed as a unit from the mounted position.

A second embodiment of the invention is illustrated in FIGS. 6 through 8. These Figures illustrate a handle or assist strap assembly of the type sometimes provided in automotive vehicles. In general, this assembly is preferably molded of a suitable high strength plastic and comprises a U-shaped handle portion 60 that is relative rigid and is shown as having a U-shaped cross section. The handle 60 includes (see FIG. 7) base portions 62 located at opposite ends of the raised center section 64. The base sections 62 each include a flat, relatively rigid bottom portion 66 which is adapted to engage against the headliner in the manner of the base 20 of the coat hook embodiment of FIGS. 1 through 5. Extending outwardly from the base 62 are a spaced pair of tapered resilient leg members 68. Legs 68 are located on opposite sides of a central open space 70. A through passage 72 extends downwardly through base 62 from an open upper end. The passage 72 is generally rectangular in shape and opens to the space 70 between the legs 68. As best seen in FIG. 7, each of the legs 68 further includes a raised latch portion 74 which functions in the manner previously described with respect to the latch portions 28 of the FIGS. 1 through 5 embodiment.

The latch legs 68 are maintained in their latched position by the generally rectangular pin member 76 which is sized and arranged to enter passage 72. When moved to a final located position as shown in FIG. 6, the pin member 76 enters between the latch legs 68 and prevents them from being withdrawn from their located position within the opening in the body panel. Suitable opposed latch fingers 80 are positioned at opposite sides of the openings 72 and serve to releasably hold the pin in either of two axially located positions. Note that the latch pin 76 has a pair of spaced recesses 82 in the nature of recesses 48 of the FIGS. 1 through 5 embodiment. These recesses are arranged to engage with the protuberances 84 formed on the latch fingers 80 (see FIG. 8). This arrangement allows the pin member to be preassembled in a preinstalled condition with the protuberances 84 engaged in the lowermost recesses 82 until after the legs have been suitably inserted in the panel opening. Thereafter, the pin can be driven to its final located position, at which time, the protuberances 84 enter the uppermost set of recesses 82.

This embodiment, like the FIGS. 1 through 5 embodiment, has a shroud 86 carried on the outer end of the pin 76. The shroud 86 is a relatively thin, shell-like member arranged to extend outwardly and downwardly from the outer end of the pin to surround and enclose the base 62. The lower edge 88 of the shroud 86 preferably is sized and located such that when the pin is in its final located position, the lower edge 88 is in surrounding and close engagement with the headliner. A suitable opening 90 is formed through the shroud 86 in closely spaced relationship to the handle. Thus, the base 62 is enclosed by the shroud to provide an attractive handle mounting. Moreover, the arrangement allows the handle to be readily removed for repair and the like.

Figure 9:
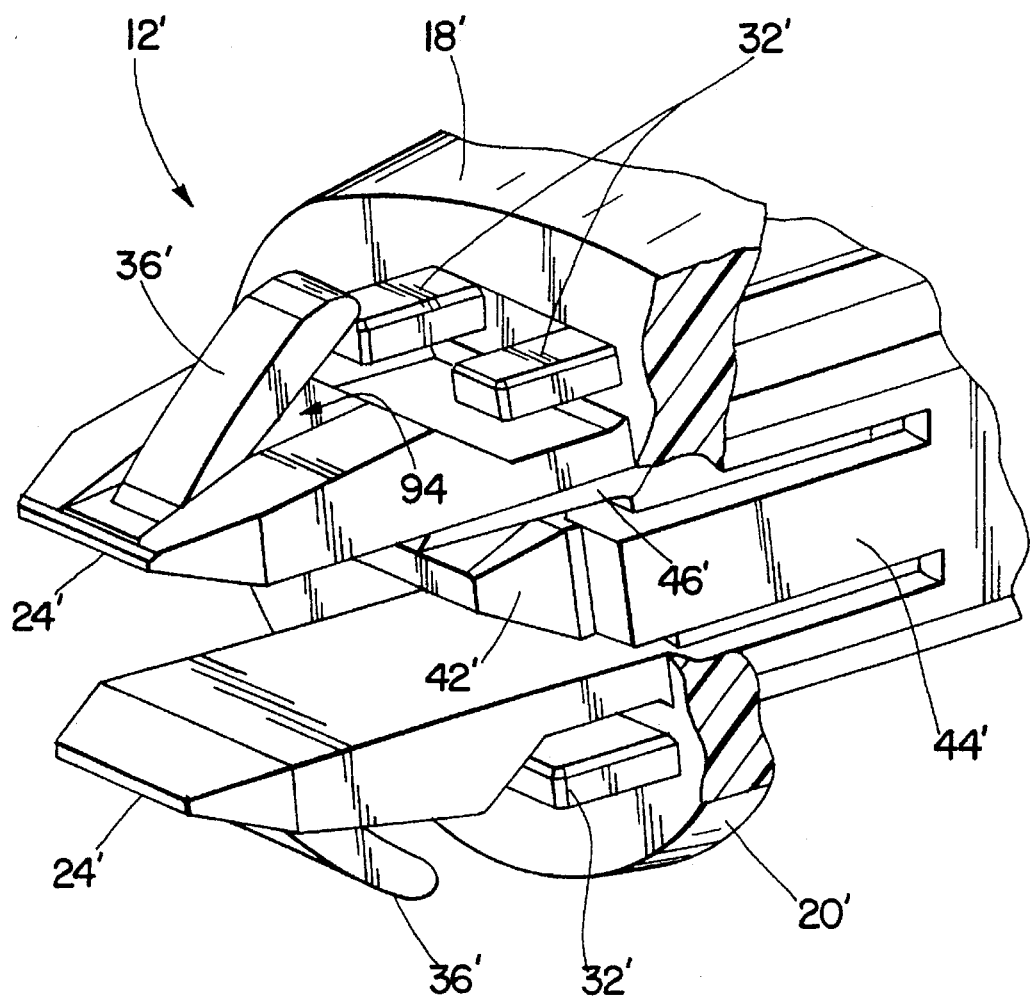
FIG. 9 is a partial isometric view showing a modified form of the invention.

FIG. 9 is an isometric view showing a modified form of the invention wherein the resilient retaining legs and the spring fingers have a design that, in some respects, simplifies the dies or tooling required to injection mold the load supporting components. In the FIG. 9 showing, reference numerals corresponding to those previously used in the FIGS. 1–5 embodiment have been employed to designate the same or similar elements but differentiated by the additional of a prime (') suffix. Unless otherwise noted, an element so designated is to be considered as having the features or characteristics as described for the FIGS. 1–5 embodiment.

According to the FIG. 9 embodiment, the resilient latch legs 24' are formed to each have a longitudinally extending, central groove 94 of rectangular cross section. Positioned in each groove 94, and molded integrally with the associated leg 24' is a single resilient spring finger 36'. The spring fingers 36' have a normal "as molded" position as illustrated. However, they are shaped and sized so that they can be deflected into the associate groove 94 to have their maximum outer extent within the effective outer surface extent of the legs 24'. Thus, the spring fingers 36' allow preassembly of the base to a panel or headliner as described with reference to the FIGS. 1–5 embodiment.

Preferably, the length and end configuration of the fingers 36' is such that when the base is finally fully assembled into the body panel (item 14 of FIG. 1), the fingers 36' are in a deflected position between the body panel mounting hole edge and the associated leg 24'. Alternatively, the fingers could be arranged to be capable of full reverse deflection to allow selective withdrawal of the assembly from the body panel.

The modified form for the legs 24' and the fingers 36' allows the part to be formed with simpler tooling as compared to the FIGS. 1–5 embodiment. In addition, however, the arrangement allows the legs to provide a four-way locating function by snapping into a slightly oversized rectangular panel hole with the sides of the legs performing the locating on all four sides of the hole rather than having the fingers perform locating on two sides as in the FIGS. 1–5 embodiment.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A push-in fastener assembly for joining a first component to a panel said first component having a protruding part adapted to bear a load comprising:

a pair of latch legs extending from the first component through an opening in the panel, the legs being on opposite sides of an open space and having spaced inner surfaces, at least one of the legs being laterally flexible relative to the opening and operative in a laterally outward position to maintain the first component latched in the opening in the panel;

a hole through the first component, said hole having an entry end in an outer surface of the first component at a location spaced from the panel and an exit end adjacent the panel and opening to the open space between the legs;

an axially elongated pin adapted to extend into the hole and having an outer end and an inner end, the inner end sized to fit through the periphery of the hole through the first component but of sufficient size to prevent said at least one leg from moving laterally inward from the said laterally outward position; and, a shroud carried by the outer end of the pin, said shroud concealing a significant portion of said protruding, load bearing part of the first component.

2. The invention as defined in claim 1 wherein the first component has a base portion adjacent the panel and a load supporting portion carried from the base portion and extending outwardly away from the panel.

3. The invention as defined in claim 2 wherein the shroud encloses the base portion.

4. The invention as defined in claim 2 wherein the hole in the first component extends through the base portion and the shroud is integrally joined to the pin.

5. The invention as defined in claim 4 wherein the shroud comprises a relatively thin shell that substantially totally encloses the base portion and provides an open space through which the load supporting portion extends.

6. The invention as defined in claim 2 wherein the first component and the pin are each plastic moldings.

7. The invention as defined in claim 2 wherein the load supporting portion terminates in a free end located outwardly of the panel.

8. The invention as defined in claim 7 wherein the load supporting portion and the base portion are an integral plastic molding.

9. The assembly as defined in claim 1 including retaining means for selectively securing the pin in a first or a second position in the hole in the first component.

10. The assembly as defined in claim 9 wherein the retaining means comprises a spring latch.

11. The assembly as defined in claim 1 wherein the first component comprises a handle having a pair of spaced base portions and the said hole through the first component extends through one of the base portions and the shroud substantially totally encloses said one base portion.

12. In combination:

a vehicle body member having an opening therethrough;

a load supporting member having a mounting base section overlying the opening;

at least a pair of legs at least one of which is radially resilient extending from the mounting base section and through the opening, said pair of legs being spaced apart to substantially engage the periphery of the opening with an open space between the legs;

an aperture through the mounting base section and opening the open space between the legs;

an elongated rigid pin having first and second ends, said pin adapted to extend axially through the aperture into the open space between the legs and having a portion adjacent the second end to maintain the legs in a radial outward position; and, a shroud joined to the first end of the pin, said shroud extending radially outwardly about the aperture and toward the vehicle body member to enclose a significant portion of the mounting base section and conceal the pin and the aperture.

13. The combination as defined in claim 1 wherein the load supporting member comprises a coat hook with a main body section extending outwardly from the base section and through the shroud.

14. The combination as defined in claim 12 including a retaining means for selectively securing the pin in the open space between the legs.

15. The combination as defined in claim 12 wherein the shroud is a shell-like member formed integrally with the pin.

16. The combination as defined in claim 12 wherein said load supporting member and said legs are integrally joined.

17. The combination as defined in claim 16 wherein said legs are each resilient and capable of radially deflecting.

18. The combination as defined in claim 16 wherein the shroud and the pin are formed integrally from plastic.

19. The combination as defined in claim 12 including resilient finger means on the legs for permitting preassembly of the load supporting member to a panel prior to assembly of the load supporting member into the opening in the vehicle body member.

* * * * *